US010251175B2

(12) United States Patent
Hu

(10) Patent No.: US 10,251,175 B2
(45) Date of Patent: Apr. 2, 2019

(54) SUB-FREQUENCY BAND SHARING METHOD AND BASE STATION, AND USER TERMINAL

(71) Applicant: Hanqiang Hu, Guangzhou (CN)

(72) Inventor: Hanqiang Hu, Guangzhou (CN)

( * ) Notice: Subject to any disclaimer, the term of this patent is extended or adjusted under 35 U.S.C. 154(b) by 74 days.

(21) Appl. No.: 15/561,086

(22) PCT Filed: Jul. 2, 2015

(86) PCT No.: PCT/CN2015/083140
§ 371 (c)(1),
(2) Date: Sep. 25, 2017

(87) PCT Pub. No.: WO2016/155137
PCT Pub. Date: Oct. 6, 2016

(65) Prior Publication Data
US 2018/0063842 A1   Mar. 1, 2018

(30) Foreign Application Priority Data

Mar. 27, 2015   (CN) .......................... 2015 1 0141749

(51) Int. Cl.
*H04W 72/04*   (2009.01)
*H04W 8/26*   (2009.01)

(52) U.S. Cl.
CPC ......... *H04W 72/0453* (2013.01); *H04W 8/26* (2013.01)

(58) Field of Classification Search
CPC .............................. H04W 72/0453; H04W 8/26
See application file for complete search history.

(56) References Cited

U.S. PATENT DOCUMENTS 5,796,776 A * 8/1998 Lomp ................... H04B 1/707
                                                          375/222
5,991,308 A * 11/1999 Fuhrmann ........... H03M 13/256
                                                        370/395.53
(Continued)

FOREIGN PATENT DOCUMENTS

AU        2008273368 B2     1/2009
CN         101027914 A       8/2007
(Continued)

OTHER PUBLICATIONS

International Search Report dated Dec. 29, 2015; PCT/CN2015/083140.
European Search Report dated Oct. 29, 2018; EP3277013A1.

*Primary Examiner* — Jay P Patel
(74) *Attorney, Agent, or Firm* — Na Xu; IPro, PLLC

(57) ABSTRACT

The present disclosure discloses a sub-frequency band sharing method, a base station and a user terminal. The method includes: assigning a unique terminal sequence code to a user terminal, and sending the terminal sequence code to the user terminal; receiving a user data packet sent by a core network; parsing the user data packet to acquire a destination user terminal to which the user data packet is to be sent; acquiring a terminal sequence code corresponding to the destination user terminal; acquiring an idle sub-frequency band in a frequency band; and modulating the user data packet and the acquired terminal sequence code to the idle sub-frequency band according to a predetermined sequence to form modulated data, wherein upon completion of the transmission of the modulated data, the sub-frequency band occupied by the modulated data is released.

20 Claims, 6 Drawing Sheets

(56) References Cited

U.S. PATENT DOCUMENTS

| | | | |
|---|---|---|---|
| 2002/0101835 A1* | 8/2002 | Gerakoulis | H04L 1/1803 370/329 |
| 2004/0109424 A1 | 6/2004 | Chheda | |
| 2005/0254471 A1 | 11/2005 | Zhang et al. | |
| 2006/0045001 A1* | 3/2006 | Jalali | H04L 5/0053 370/208 |
| 2008/0137634 A1 | 6/2008 | Hassan et al. | |
| 2008/0225787 A1 | 9/2008 | Parts et al. | |
| 2010/0190506 A1 | 7/2010 | To et al. | |
| 2010/0272048 A1* | 10/2010 | Pan | H04L 1/1635 370/329 |
| 2011/0103338 A1 | 5/2011 | Parkvall | |
| 2012/0182875 A1 | 7/2012 | Hassan et al. | |
| 2013/0242828 A1* | 9/2013 | Sahu | H04W 52/0229 370/311 |
| 2014/0293926 A1 | 10/2014 | To et al. | |
| 2015/0043389 A1* | 2/2015 | Dhanda | H04L 5/0048 370/278 |
| 2015/0188651 A1 | 7/2015 | Hassan et al. | |
| 2015/0188652 A1 | 7/2015 | Hassan et al. | |
| 2015/0188655 A1 | 7/2015 | Hassan et al. | |

FOREIGN PATENT DOCUMENTS

| | | |
|---|---|---|
| CN | 101098188 A | 1/2008 |
| CN | 101563863 A | 10/2009 |
| CN | 101627597 A | 1/2010 |
| CN | 101803418 A | 8/2010 |
| CN | 102017750 A | 4/2011 |
| CN | 102196448 A | 9/2011 |
| CN | 104717663 A | 6/2015 |
| EP | 2115983 A1 | 11/2009 |
| EP | 2127144 A1 | 12/2009 |
| EP | 2169866 A1 | 3/2010 |
| EP | 2250851 A1 | 11/2010 |
| JP | 2010512717 A | 4/2010 |
| JP | WO2009008398 A1 | 9/2010 |
| JP | 5087083 B2 | 11/2012 |
| JP | 2012249333 A | 12/2012 |
| KR | 20090087953 A | 8/2009 |
| KR | 20140018434 A | 2/2014 |
| TW | 200944025 A | 10/2009 |
| WO | 2005109927 A2 | 11/2005 |
| WO | 2008073697 A1 | 6/2008 |
| WO | 2008107520 A1 | 9/2008 |
| WO | 2009008398 A1 | 1/2009 |
| WO | 2009110821 A1 | 9/2009 |

* cited by examiner

SUB-FREQUENCY BAND SHARING METHOD AND BASE STATION, AND USER TERMINAL

CROSS-REFERENCE TO RELATED APPLICATIONS

This application is a National Stage of International Patent Application No. PCT/CN2015/083140 with an international filing date of Jul. 2, 2015, which is based upon and claims priority to Chinese Patent Application No. 201510141749.2, filed with the Chinese Patent Office on Mar. 27, 2015, titled "SUB-FREQUENCY BAND SHARING METHOD, BASE STATION AND USER TERMINAL", the entire contents of which are incorporated herein by reference.

TECHNICAL FIELD

The present disclosure relates to the technical field of communications, and in particular, relates to a sub-frequency band sharing method, a base station and a user terminal.

BACKGROUND

With an evolution of mobile communications from the third generation (3G) communication to the fifth generation (5G) communication, mobile communications need to support transmission of large-volume data and connection of masses of user terminals.

When data is transmitted between a base station and a user terminal, the data needs to be modulated to a frequency band and then transmitted over the frequency band. However, the frequency band is limited and non-renewable. However, during data transmission in the prior art, a transmission channel needs to be established between the base station and the user terminal. The transmission channel occupies the entire frequency band. Before the transmission channel is released, that is, when no data is transmitted over the transmission channel, the entire frequency band may not be used by a third party.

SUMMARY

The technical problem to be solved by the present disclosure is to provide a sub-frequency band sharing method, a base station and a user terminal, which enable a plurality of user terminals and a plurality of base stations to share a plurality of sub-frequency bands, thereby improving utilization rate of the frequency band.

To solve the above technical problem, one technical solution of the present disclosure is to provide a sub-frequency band sharing method. The method includes: assigning a unique terminal sequence code to a user terminal, and sending the terminal sequence code to the user terminal when the user terminal is connected to a base station; receiving a user data packet sent by a core network; parsing the user data packet to acquire a destination user terminal to which the user data packet is to be sent; acquiring a terminal sequence code corresponding to the destination user terminal; acquiring an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; and modulating the user data packet and the acquired terminal sequence code to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

The step of acquiring an idle sub-frequency band of the base station includes: reporting a request packet to a controller, wherein the request packet is used to request an idle sub-frequency band; and receiving an idle sub-frequency band returned by the controller after the controller extracts the idle sub-frequency band from a frequency band queue according to the reported request packet.

To solve the above technical problem, another technical solution of the present disclosure is to provide another sub-frequency band sharing method. The method includes: acquiring, by a user terminal, a terminal sequence code of the user terminal, wherein the terminal sequence code is unique, and one terminal sequence code corresponds to one user terminal; performing polling on sub-frequency bands included in a frequency band to detect whether modulated data is present, wherein the frequency band is divided into a plurality of sub-frequency bands, and one or a plurality of base stations connected to the user terminal and a plurality of user terminals serviced by the one or a plurality of base stations share the sub-frequency band to transmit data; extracting a terminal sequence code carried in the modulated data if the modulated data is present; judging whether the extracted terminal sequence code is the same as the terminal sequence code of the user terminal; extracting a user data packet from the modulated data if the extracted terminal sequence code is the same as the terminal sequence code of the user terminal; and discarding the modulated data if the extracted terminal sequence code is not the same as the terminal sequence code of the user terminal.

To solve the above technical problem, still another technical solution of the present disclosure is to provide still another sub-frequency band sharing method. The method includes: receiving a base station sequence code sent by a base station when a user terminal is connected to the base station, wherein the base station sequence code is unique, and one base station corresponds to one base station sequence code; acquiring a base station sequence code of a destination base station, a to-be-sent user data packet and an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; and modulating the base station sequence code and the to-be-sent user data packet of the destination base station to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

To solve the above technical problem, yet still another technical solution of the present disclosure is to provide yet still another sub-frequency band sharing method. The method includes: acquiring, by a base station, a base station sequence code of the base station, wherein the base station sequence code is unique, and one base station corresponds to one base station sequence code; performing polling on sub-frequency bands included in a frequency band to detect whether modulated data is present, wherein the frequency band is divided into a plurality of sub-frequency bands, and one or a plurality of base stations and a plurality of user terminals serviced by the one or a plurality of base stations share the sub-frequency band to transmit data; extracting a base station sequence code carried in the modulated data if the modulated data is present; judging whether the extracted base station sequence code is the same as the base station sequence code of the base station; extracting a user data packet from the modulated data if the extracted base station sequence code is the same as the base station sequence code of the base station; and discarding the modulated data if the extracted base station sequence code is not the same as the base station sequence code of the base station.

To solve the above technical problem, still yet another technical solution of the present disclosure is to provide a base station. The base station includes: an assigning module, configured to assign a unique terminal sequence code to a user terminal when the user terminal is connected to the base station; a sending module, configured to send the terminal sequence code to the user terminal; a receiving module, configured to receive a user data packet sent by a core network; a parsing module, configured to parse the user data packet to acquire a destination user terminal to which the user data packet is to be sent; a first acquiring module, configured to acquire a terminal sequence code corresponding to the destination user terminal; a second acquiring module, configured to acquire an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; and a modulating module, configured to modulate the acquired terminal sequence code and the user data packet to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

The second acquiring module includes: a reporting unit, configured to report a request packet to a controller, wherein the request packet is used to request an idle sub-frequency band; and a receiving unit, configured to receive an idle sub-frequency band returned by the controller after the controller extracts the idle sub-frequency band from a frequency band queue according to the reported request packet.

To solve the above technical problem, yet still another technical solution of the present disclosure is to provide a user terminal. The user terminal includes: an acquiring module, configured to acquire a terminal sequence code of the user terminal, wherein the terminal sequence code is unique, and one terminal sequence code corresponds to one user terminal; a polling module, configured to perform polling sub-frequency bands included in a frequency band to detect whether modulated data is present, wherein the frequency band is divided into a plurality of sub-frequency bands, and one or a plurality of base stations connected to the user terminal and a plurality of user terminals serviced by the one or a plurality of base stations share the sub-frequency band to transmit data; a first extracting module, configured to extract a terminal sequence code carried in the modulated data if the polling module detects that the modulated data is present; a judging module, configured to judge whether the extracted terminal sequence code is the same as the terminal sequence code of the user terminal; a second extracting module, configured to extract a user data packet from the modulated data if the judging module judges that the extracted terminal sequence code is the same as the terminal sequence code of the user terminal; and a discarding module, configured to discard the modulated data if the judging module judges that the extracted terminal sequence code is not the same as the terminal sequence code of the user terminal.

To solve the above technical problem, yet still another technical solution of the present disclosure is to provide another user terminal. The user terminal includes: a receiving module, configured to receive a base station sequence code sent by a base station when a user terminal is connected to the base station, wherein the base station sequence code is unique, and one base station corresponds to one base station sequence code; an acquiring module, configured to acquire a base station sequence code of a destination base station, a to-be-sent user data packet and an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; a modulating module, configured to modulate the base station sequence code and the to-be-sent user data packet of the destination base station to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

To solve the above technical problem, yet still another technical solution of the present disclosure is to provide another base station. The base station includes: an acquiring module, configured to acquire a base station sequence code of the base station, wherein the base station sequence code is unique, and one base station corresponds to one base station sequence code; a polling module, configured to perform polling on sub-frequency bands included in a frequency band to detect whether modulated data is present, wherein the frequency band is divided into a plurality of sub-frequency bands, and one or a plurality of base stations and a plurality of user terminals serviced by the one or a plurality of base stations share the sub-frequency band to transmit data; a first extracting module, configured to extract a base station sequence code carried in the modulated data if the polling module detects that the modulated data is present; a judging module, configured to judge whether the extracted base station sequence code is the same as the base station sequence code of the base station; a second extracting module, configured to extract the base station sequence code carried in the modulated data if the judging module judges that the extracted base station sequence code is the same as the base station sequence code of the base station; and a discarding module, configured to discard the modulated data if the judging module judges that the extracted base station sequence code is not the same as the base station sequence code of the base station.

DETAILED DESCRIPTION

The present disclosure is further described with reference to the accompanying drawings and exemplary embodiments.

Figure 1:
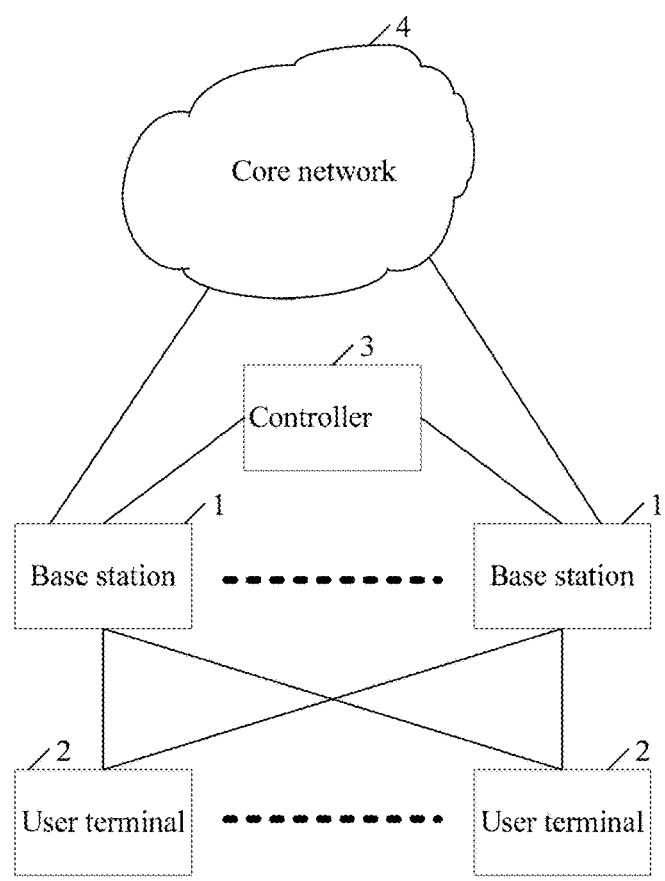
FIG. 1 is a schematic structural diagram of a communication system according to an embodiment of the present disclosure.

Referring to FIG. 1, a communication system includes: a base station 1, a user terminal 2, a controller 3, and a core network 4. The user terminal 2 is connected to the base station 1 in a wireless manner, and the base station 1 is connected to the controller 3 and the core network 4 respectively, wherein a plurality of user terminals 2 and base stations 1 are provided. The user terminal 2 may establish a wireless connection with the base station 1 as long as the user terminal 2 is within the coverage of the base station 1. To be specific, one base station 1 may service a plurality of user terminals 2, or one user terminal 2 may access a plurality of base stations 1. The user terminals 2 within the coverage of the base station 1 may also be collectively referred to as user terminals serviced by the base station 1. In addition, a frequency band for use in communication between the user terminal 2 and the base station 1 may be divided into a plurality of sub-frequency bands, and one or a plurality of base stations and a plurality of user terminals may share the sub-frequency band to transmit data. The user terminal 2 may be a device configured to connect to the base station 1, such as, a mobile phone, a tablet computer, a sensor, a sensing gateway or the like.

The base station sends data to the user terminal, which is referred to as downlink transmission of data, and the user terminal sends data to the base station, which is referred to as uplink transmission of data.

Figure 2:
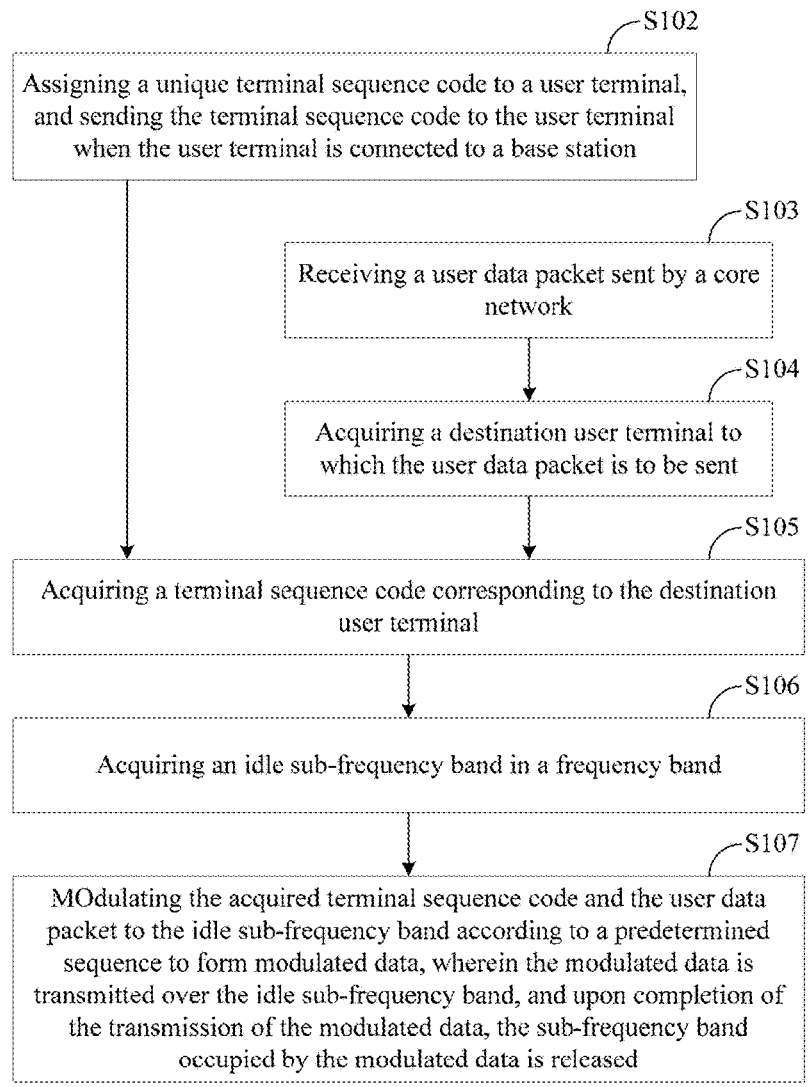
FIG. 2 is a flowchart of a sub-frequency band sharing method according to a first embodiment of the present disclosure.

(I) In downlink transmission of data:

Referring to FIG. 2, FIG. 2 is a flowchart of a sub-frequency band sharing method according to a first embodiment of the present disclosure. The method includes the following steps:

Step S102: A unique terminal sequence code is assigned to a user terminal, and the terminal sequence code is sent to the user terminal when the user terminal is connected to a base station.

Before communicating with the base station, the user terminal needs to establish a connection with the base station. The base station assigns a unique and induplicate terminal sequence code to each of the user terminals serviced by the base station. Nevertheless, a mapping relationship between the user terminals and terminal sequence codes may also be established during assignment of the terminal sequence codes, which facilitates the search for a terminal sequence code. In other alternative embodiments, the user terminal and the base station may also negotiate the terminal sequence code, for example, defining a media access control (MAC) address of the user terminal as the terminal sequence code. In this case, assigning a unique terminal sequence code to the user terminal by the base station may be directly: extracting the MAC address of the user terminal, and using the MAC address as the terminal sequence code of the user terminal.

Step S103: A user data packet sent by a core network is received.

Step S104: The user data packet is parsed to acquire a destination user terminal to which the user data packet is to be sent.

The user data packet carries an identifier of the destination user terminal to which the user data packet is to be sent, for example, an IP address, a MAC address or the like of the user terminal. Nevertheless, the user data packet may also include a source address.

Step S105: A terminal sequence code corresponding to the destination user terminal is acquired.

Step S106: An idle sub-frequency band in a frequency band is acquired.

Figure 3:
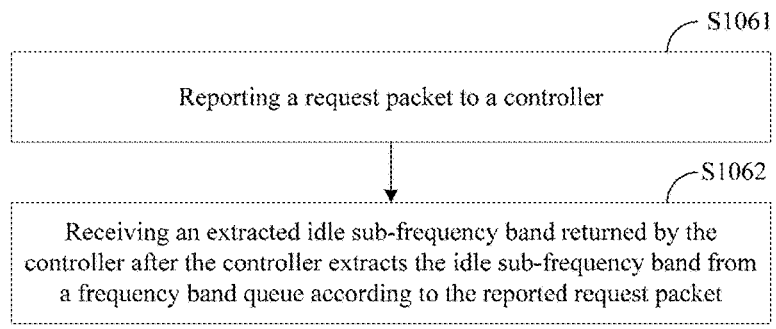
FIG. 3 is a flowchart of requesting an idle sub-frequency band in the sub-frequency band sharing method according to the first embodiment of the present disclosure.

The frequency band is divided into a plurality of sub-frequency bands. One or a plurality of base stations connected to the user terminals and a plurality of user terminals serviced by the one or a plurality of base stations share the sub-frequency band to transmit data, such that a plurality of users share the sub-frequency band. The sub-frequency bands may be uniformly controlled by a controller. As illustrated in FIG. 3, step S106 further includes the following steps:

Step S1061: A request packet is reported to a controller.

The request packet is used to request an idle sub-frequency band from the controller.

Step S1062: An idle sub-frequency band returned by the controller is received after the controller extracts the idle sub-frequency band from a frequency band queue according to the reported request packet.

The frequency band queue is used to manage sub-frequency bands. In this embodiment, the frequency band queue is preferably a first in first out (FIFO) queue. In management of the sub-frequency bands, the controller manages the idle sub-frequency bands according to the FIFO queue. When a sub-frequency band needs to be assigned, an idle sub-frequency band at the head of the FIFO queue is extracted. When an occupied sub-frequency band is released, the released sub-frequency band returns to the tail of the FIFO queue. The system may have one or a plurality of frequency band queues.

Step S107: The acquired terminal sequence code and the user data packet are modulated to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

The modulated data may be configured in the format of terminal sequence code+user data packet. Preferably, the terminal sequence code is followed by the user data packet. Nevertheless, in another alternative embodiment, the modulated data may also be configured in the format of user data packet+terminal sequence code; or the bits occupied by the terminal sequence code and the user data packet may be defined according to the actual needs, which is not limited herein. The receiving party may demodulate the data according to the format of the modulated data. In addition, a check code may also be added to the tail of the modulated data. The acquired terminal sequence code and user data packet may be sequentially modulated to the acquired sub-frequency band by using the modulation algorithms including frequency-shift keying (FSK) modulation algorithm or orthogonal frequency division multiplexing (OFDM) modulation algorithm.

It should be noted that when data is transmitted between a user terminal and a base station, one specific sub-frequency band may not be exclusively occupied and the sub-frequency band may not be constantly occupied, instead a sub-frequency band may be requested for data transmission between the user terminal and the base station according to the user data packet. For example, when the user terminal needs to send a user data packet to the base station, the user terminal requests an idle sub-frequency band; and upon completion of transmission of the user data packet, the occupied sub-frequency band is released.

In the embodiment of the present disclosure, a base station modulates a terminal sequence code and a user data packet to an idle sub-frequency band, and a user terminal performs polling on the sub-frequency bands to detect modulated data; if the user terminal detects the modulated data and the terminal sequence code carried in the modulated data is the same as the terminal sequence code of the user terminal, the user terminal extracts the user data packet from the modulated data, such that the sub-frequency bands are shared between multi-user terminal and the base station, and utilization rate of the frequency band is improved. In addition, neither the user terminal nor the base station occupies the sub-frequency band, but only occupies the sub-frequency bands when transmitting the user data packet. When the user data packet is not transmitted, the occupied sub-frequency bands are released, such that the utilization rate of the sub-frequency bands is higher.

Figure 4:
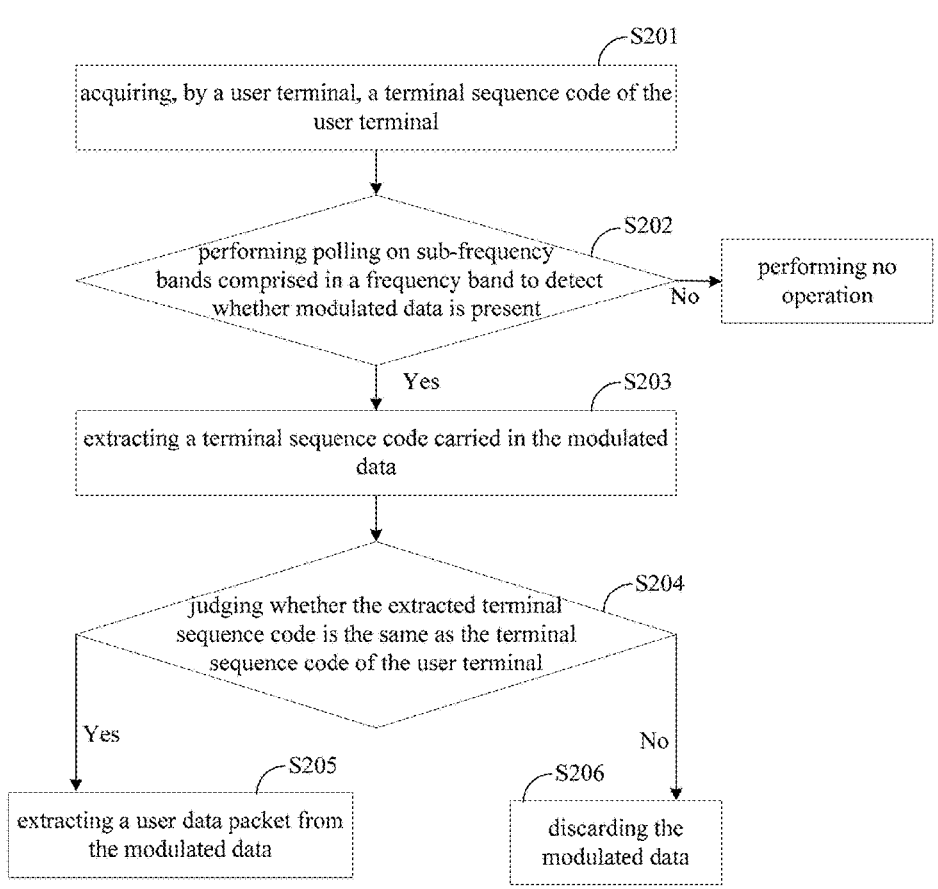
FIG. 4 is a flowchart of a sub-frequency band sharing method according to a second embodiment of the present disclosure.

Referring to FIG. 4, FIG. 4 is a flowchart of a sub-frequency band sharing method according to a second embodiment of the present disclosure. The method includes the following steps:

Step S201: A user terminal acquires a terminal sequence code of the user terminal.

The terminal sequence code may be assigned and sent by the base station. In this case, step S201 may be specifically: receiving the terminal sequence code sent by the base station; or the terminal sequence code is negotiated by the base station and the user terminal, for example, defining a MAC address of the user terminal as the terminal sequence code. The terminal sequence code is unique, and one terminal sequence code corresponds to one user terminal.

Step S202: Polling is performed on sub-frequency bands included in a frequency band to detect whether modulated data is present, and step S203 is performed if the modulated data is present, and no operation is performed if the modulated data is not present.

The frequency band is divided into a plurality of sub-frequency bands, and one or a plurality of base stations connected to the user terminal and a plurality of user terminals serviced by the one or a plurality of base stations share the sub-frequency band to transmit data. In this way, a plurality of users share the sub-frequency band. A frequency of polling by the user terminal may be defined according to actual needs.

Step S203: The terminal sequence code carried in the modulated data is extracted.

The terminal sequence code is extracted according to a predetermined format of the modulated data.

Step S204: Whether the extracted terminal sequence code is the same as the terminal sequence code of the user terminal is judged, step S205 is performed if the extracted terminal sequence code is the same as the terminal sequence code of the user terminal, and step S206 is performed if extracted terminal sequence code is not the same as the terminal sequence code of the user terminal.

Step S205: A user data packet is extracted from the modulated data.

If the extracted terminal sequence code is the same as the received terminal sequence code, the current modulated data is sent to the user terminal.

Step S206: The modulated data is discarded.

If the extracted terminal sequence code is not the same as the received terminal sequence code, the current modulated data is not to be sent to the user terminal.

In the embodiment of the present disclosure, a user terminal polls on sub-frequency bands to detect whether modulated data is present; if it is detected that the modulated data is present and it is judged that a terminal sequence code carried in the modulated data is the same as the terminal sequence code of the user terminal, the modulated data is to be sent to the user terminal, and the user terminal extracts a user data packet from the modulated data. In this way, the sub-frequency bands are shared between multi-user terminal and the base station, and utilization rate of the frequency band is improved.

Figure 5:
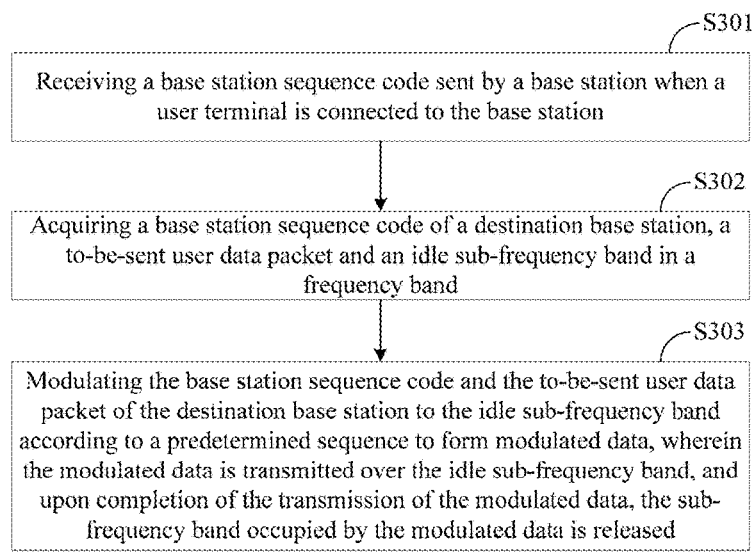
FIG. 5 is a flowchart of a sub-frequency band sharing method according to a third embodiment of the present disclosure.

(II) In uplink transmission of data:

Referring to FIG. 5, FIG. 5 is a flowchart of a sub-frequency band sharing method according to a third embodiment of the present disclosure. The method includes the following steps:

Step S301: A base station sequence code sent by a base station is received when a user terminal accesses the base station.

The base station sequence code is unique, and one base station corresponds to one base station sequence code. The base station sequence code is assigned by a core network, and the base station sequence codes in a management domain of the core network are different.

Step S302: A base station sequence code of a destination base station, a to-be-sent user data packet and an idle sub-frequency band in a frequency band are acquired.

The destination base station is the destination to where the to-be-sent user data packet is sent. The frequency band is divided into a plurality of sub-frequency bands, and one or a plurality of base stations connected to the user terminal and a plurality of user terminals serviced by the one or a plurality of base stations share the sub-frequency band to transmit data, such that a plurality of users share the sub-frequency band, wherein one or a plurality of sub-frequency bands may be shared. The sub-frequency bands may be uniformly managed by a controller, and when acquiring the idle sub-frequency band, the user terminal may apply to the controller.

Step S303: The base station sequence code and the to-be-sent user data packet of the destination base station are modulated to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

The modulated data has a predetermined format, and for the format of the modulated data, reference may be made to the above embodiment, which is not described herein any further. The modulation algorithm of the modulated data includes frequency-shift keying (FSK) modulation algorithm, or orthogonal frequency division multiplexing (OFDM) modulation algorithm.

In the embodiment of the present disclosure, a user terminal modulates a base station sequence code and a to-be-sent user data packet of a destination base station to an idle sub-frequency band to form modulated data, and the modulated data is transmitted over the idle sub-frequency band. The base station searches for a user data packet sent to the base station by performing polling on sub-frequency bands included in a frequency band. In this way, a plurality of sub-frequency bands are shared between a plurality of user terminals and the base stations, and utilization rate of the frequency band is improved.

Figure 6:
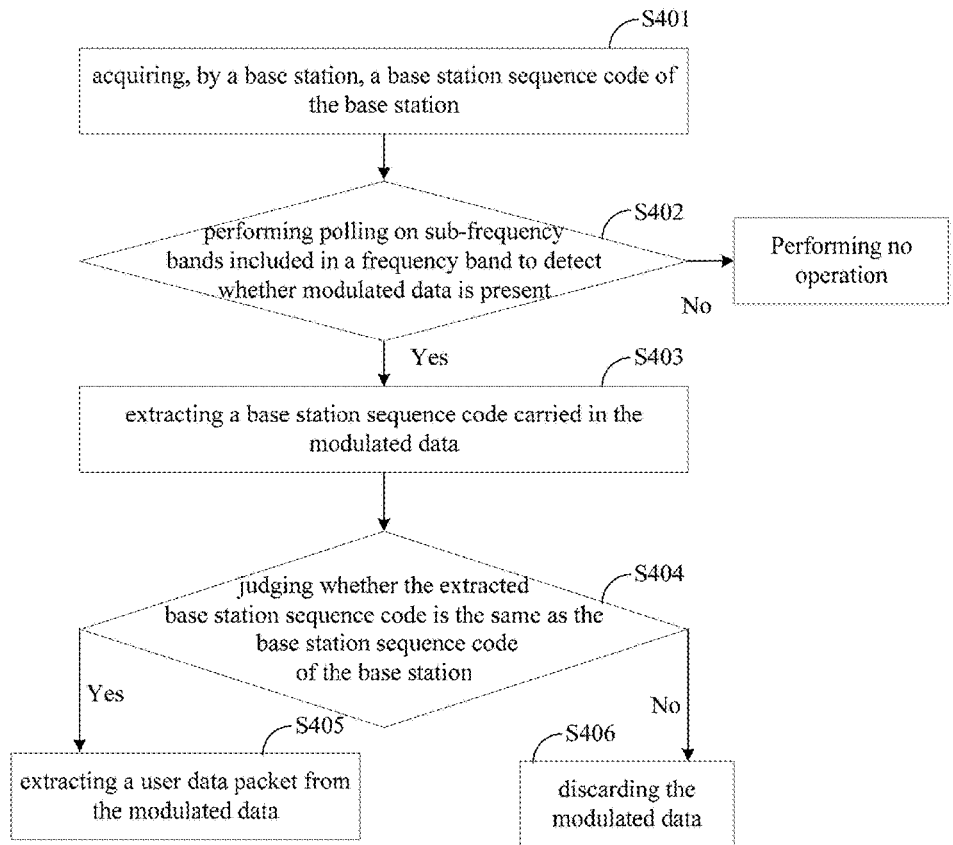
FIG. 6 is a flowchart of a sub-frequency band sharing method according to a fourth embodiment of the present disclosure.

Referring to FIG. 6, FIG. 6 is a flowchart of a sub-frequency band sharing method according to a fourth embodiment of the present disclosure. The method includes the following steps:

Step S401: A base station acquires a base station sequence code of the base station.

The base station sequence code may be predefined in the base station, or may be assigned by a core network. In this case, acquiring a base station sequence code of the base station may also be: receiving a base station sequence code assigned by the core network. The core network assigns base station sequence codes to all the base station in the management domain of the core network, wherein the base station sequence code is unique, and one base station corresponds to one base station sequence code. Nevertheless, during assignment of the base station sequence codes by the core network, a mapping table between base station sequence codes and base station identifiers may be established; and the base station acquires the base station sequence code thereof based on the mapping table, and sends the base station sequence code thereof to user terminals connected to the base station.

Step S402: Polling is performed on sub-frequency bands included in a frequency band to detect whether modulated data is present, and step S403 is performed if the modulated data is present, and no operation is performed if the modulated data is not present.

The frequency band is divided into a plurality of sub-frequency bands, and one or a plurality of base stations and a plurality of user terminals serviced by the one or a plurality of base stations share the sub-frequency band to transmit data. A frequency of polling by the base station on the sub-frequency bands may be defined according to actual needs.

Step S403: A base station sequence code carried in the modulated data is extracted.

Step S404: Whether the acquired base station sequence code is the same as the base station sequence code of the base station is judged, step S405 is performed if the acquired base station sequence code is the same as the base station sequence code of the base station, and step S406 is performed if the acquired base station sequence code is not the same as the base station sequence code of the base station.

Step S404: A user data packet is extracted from the modulated data.

If the acquired base station sequence code is the same as the base station sequence code of the base station, the current modulated data is to be sent to the base station, and the user data packet is extracted.

Step S405: The modulated data is discarded.

If the acquired base station sequence code is not the same as the base station sequence code of the base station, the current modulated data is not to be sent to the base station, the modulated data is discarded, and no operation is performed.

In the embodiment of the present disclosure, a base station performs polling on sub-frequency bands to detect whether modulated data is present; if it is detected that the modulated data is present and it is judged that a base station sequence code carried in the modulated data is the same as the base station sequence code of the base station, the modulated data is to be sent to the base station, and the base station extracts a user data packet from the modulated data. In this way, a plurality of sub-frequency bands are shared between a plurality of user terminals and the base stations, and utilization rate of the frequency band is improved.

Figure 7:
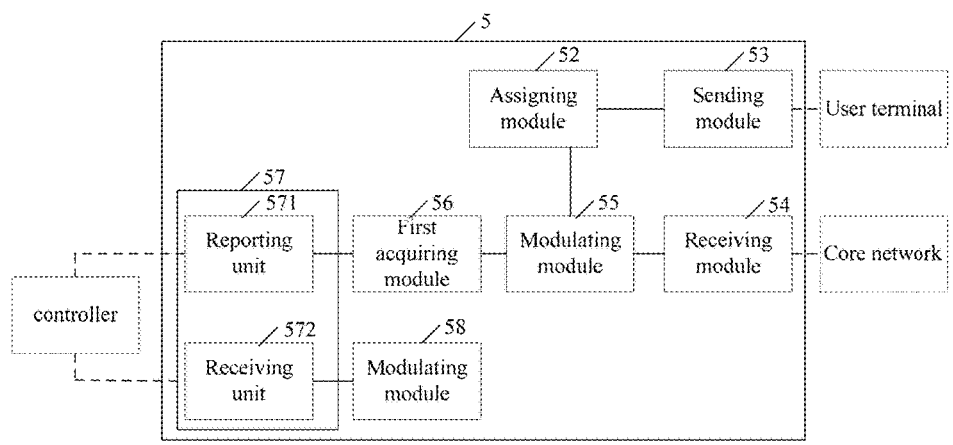
FIG. 7 is a schematic structural diagram of a base station according to the first embodiment of the present disclosure.

Referring to FIG. 7, FIG. 7 is a schematic structural diagram of a base station 5 according to the first embodiment of the present disclosure. The base station 5 includes: an assigning module 52, a sending module 53, a receiving module 54, a parsing module 55, a first acquiring module 56, a second acquiring module 57, and a modulating module 58.

The assigning module 52 is configured to assign a unique terminal sequence code to a user terminal when the user terminal is connected to the base station. The sending module 53 is configured to send the terminal sequence code of the user terminal to the user terminal. The receiving module 54 is configured to receive a user data packet sent by a core network. The parsing module 54 is configured to parse the user data packet to acquire a destination user terminal to which the user data packet is to be sent. The first acquiring module 56 is configured to acquire a terminal sequence code corresponding to the destination user terminal. The second acquiring module 57 is configured to acquire an idle sub-frequency band in a frequency band, wherein the frequency between the base station and the user terminal is divided into a plurality of sub-frequency bands, and the sub-frequency band is shared between the base station and the user terminal, such that one or a plurality of base stations connected to the user terminal and a plurality of user terminals serviced by the one or a plurality of base stations share the sub-frequency band to transmit data. In this way, a plurality of users share the sub-frequency band. The modulating module 58 is configured to modulate the acquired terminal sequence code and the user data packet to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

The sub-frequency bands are uniformly managed by a controller. In this case, the second acquiring module 57 includes a reporting unit 571 and a receiving unit 572. The reporting unit 571 is configured to report a request packet to the controller, wherein the request packet is used to request an idle sub-frequency band. The receiving unit 572 is configured to receive an idle sub-frequency band returned by the controller after the controller extracts the idle sub-frequency band from a frequency band queue according to the reported request packet. In this embodiment, the frequency band queue is an FIFO queue.

In the embodiment of the present disclosure, a base station modulates a terminal sequence code and a user data packet to an idle sub-frequency band, and a user terminal performs polling on sub-frequency bands to detect whether modulated data is present; if it is detected that the modulated data is present and the terminal sequence code carried in the modulated data is the same as the terminal sequence code of the user terminal, the modulated data is to be sent to the user terminal, and the user terminal extracts the user data packet from the modulated data, such that the sub-frequency bands are shared between multi-user terminal and the base station, and utilization rate of the frequency band is improved.

Figure 8:
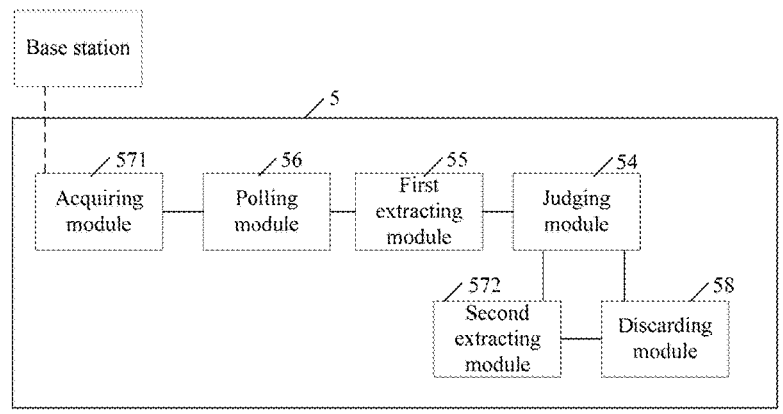
FIG. 8 is a schematic structural diagram of a user terminal according to the first embodiment of the present disclosure.

Referring to FIG. 8, FIG. 8 is a schematic structural diagram of a user terminal 6 according to the first embodiment of the present disclosure. The user terminal 6 includes: an acquiring module 61, a polling module 62, a first extracting module 63, a judging module 64, a second extracting module 65, and a discarding module 66.

The acquiring module 61 is configured to acquire a terminal sequence code of the user terminal, wherein the terminal sequence code is unique, and one terminal sequence code corresponds to one user terminal. The polling module 62 is configured to perform polling on sub-frequency bands included in a frequency band to detect whether modulated data is present, wherein the frequency band is divided into a plurality of sub-frequency bands, and one or a plurality of base stations connected to the user terminal 6 and a plurality of user terminals serviced by the one or a plurality of base stations share the sub-frequency band to transmit data, such that a plurality of users share the sub-frequency band. The first extracting module 63 is configured to extract a base station sequence code carried in the modulated data if the polling module 62 detects that the modulated data is present. The judging module 64 is configured to judge whether the extracted terminal sequence code is the same as the received terminal sequence code. The second extracting module 65 is configured to extract a user data packet from the modulated data if the judging module 64 judges that the extracted terminal sequence code is the same as the received terminal sequence code. The discarding module 66 is configured to discard the modulated data if the judging module 64 judges that the extracted terminal sequence code is not the same as the received terminal sequence code.

In the embodiment of the present disclosure, a user terminal performs polling on sub-frequency bands to detect whether modulated data is present, and if it is detected that the modulated data is present and it is judged that a terminal sequence code carried in the modulated data is the same as the terminal sequence code of the user terminal, the modulated data is to be sent to the user terminal, and the user terminal extracts a user data packet from the modulated data. In this way, a plurality of sub-frequency bands are shared between a plurality of user terminals and the base stations, and utilization rate of the frequency band is improved.

Figure 9:
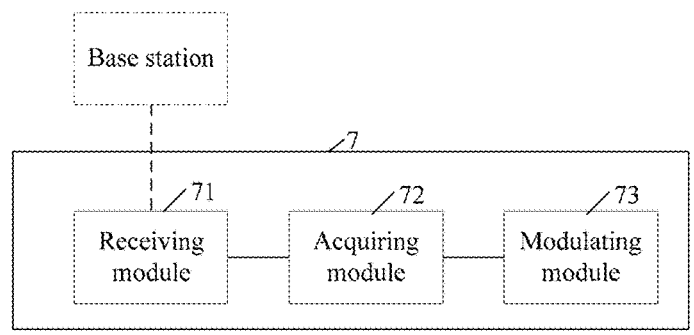
FIG. 9 is a schematic structural diagram of a user terminal according to the second embodiment of the present disclosure.

Referring to FIG. 9, FIG. 9 is a schematic structural diagram of a user terminal 7 according to the second embodiment of the present disclosure. The user terminal 7 includes: a receiving module 71, an acquiring module 72, and a modulating module 73.

The receiving module 71 is configured to receive a base station sequence code sent by a base station when a user terminal is connected to the base station, wherein the base station sequence code is unique, and one base station corresponds to one base station sequence code. It should be noted that a core network sends a base station sequence code of a base station to a user terminal by means of forwarding via the base station. The acquiring module 72 is configured to acquire a base station sequence code of a destination base station, a to-be-sent user data packet and an idle sub-frequency band in a frequency band, wherein the frequency between the base station and the user terminal is divided into a plurality of sub-frequency bands, and the sub-frequency band is shared between the base station and the user terminal, such that one or a plurality of base stations connected to the user terminal and a plurality of user terminals serviced by the one or a plurality of base stations share the sub-frequency band to transmit data. In this way, a plurality of users share the sub-frequency band. A mapping relationship may be established between base station sequence codes and base station identifiers. Therefore, a base station sequence code may be searched based on a base station identifier, or a base station identifier may be searched based on a base station sequence code. The modulating module 73 is configured to modulate the base station sequence code and the to-be-sent user data packet of the destination base station to the idle sub-frequency band to form modulated data, wherein the modulated data is transmitted over the idle sub-frequency band, and upon completion of the transmission of the modulated data, the sub-frequency band occupied by the modulated data is released.

In the embodiment of the present disclosure, a user terminal modulates a base station sequence code and a to-be-sent user data packet of a destination base station to an idle sub-frequency band to form modulated data, and the modulated data is transmitted over the idle sub-frequency band. The base station searches for a user data packet sent to the base station by performing polling on sub-frequency bands included in a frequency band. In this way, a plurality of sub-frequency bands are shared between a plurality of user terminals and the base stations, and utilization rate of the frequency band is improved.

Figure 10:
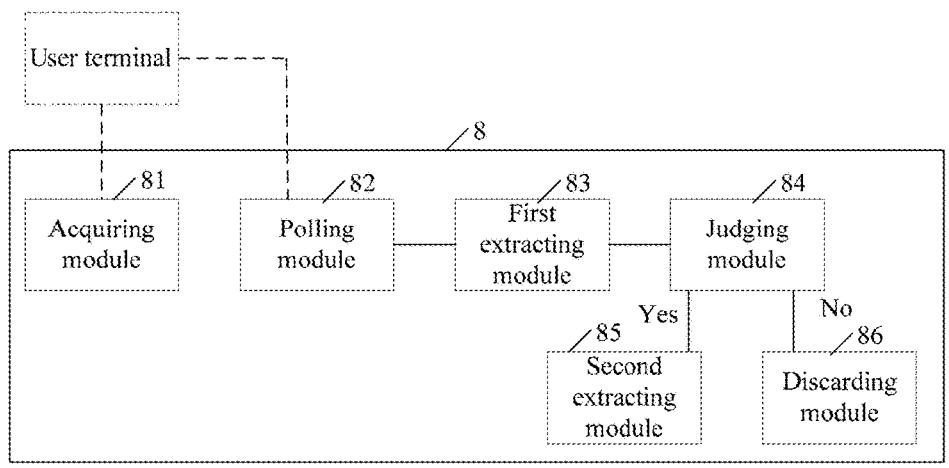
FIG. 10 is a schematic structural diagram of a base station according to the second embodiment of the present disclosure.

Referring to FIG. 10, FIG. 10 is a schematic structural diagram of a base station 8 according to the second embodiment of the present disclosure. The base station 8 includes: an acquiring module 81, a polling module 82, a first extracting module 83, a judging module 84, a second extracting module 85, and a discarding module 86.

The acquiring module 81 is configured to acquire a base station sequence code of the base station, wherein the base station sequence code is unique, and one base station corresponds to one base station sequence code. The polling module 82 is configured to perform polling on sub-frequency bands included in a frequency band to detect whether modulated data is present, wherein the frequency band is divided into a plurality of sub-frequency bands, and one or a plurality of base stations and a plurality of user terminals serviced by the one or a plurality of base stations share the sub-frequency band to transmit data, such that a plurality of users share the sub-frequency band. The first extracting module 83 is configured to extract a base station sequence code carried in the modulated data if the polling module 82 detects that the modulated data is present. The judging module 84 is configured to judge whether the extracted base station sequence code is the same as the base station sequence code of the base station. The second extracting module 85 is configured to extract the base station sequence code carried in the modulated data if the judging module 84 judges that the extracted base station sequence code is the same as the base station sequence code of the base station. The discarding module 86 is configured to discard the modulated data if the judging module 84 judges that the extracted base station sequence code is not the same as the received base station sequence code.

In the embodiment of the present disclosure, a base station performs polling on sub-frequency bands to detect whether modulated data is present, and if it is detected that the modulated data is present and it is judged that a base station sequence code carried in the modulated data is the same as the base station sequence code of the base station, the modulated data is to be sent to the base station, and the base station extracts a user data packet from the modulated data. In this way, a plurality of sub-frequency bands are shared between a plurality of user terminals and the base stations, and utilization rate of the frequency band is improved.

For a better understanding of the present disclosure, description is given herein after with reference to some examples.

1. In downlink transmission of data:

The base station sends data:

(1) The base station assigns an induplicate terminal sequence code to each user terminal.

The base station may assign an induplicate terminal sequence code to a user terminal when the user terminal requests an access to the base station.

(2) The system divides a frequency band into n sub-frequency bands.

The sub-frequency bands may be FDMA or OFDM sub-frequency bands.

(3) One or a plurality of base stations transmit data for a plurality of users connecting to and sharing a sub-frequency band, and sequentially modulate terminal sequence code and a corresponding data packet of a plurality of user terminals to the sub-frequency band for transmission, wherein the terminal sequence code of the user terminal is followed by the user data packet of the user which is further followed by the terminal sequence code of a next user terminal and the user data packet of a next user and the like.

The terminal sequence code may be modulated to the sub-frequency band by using a common modulation method, for example, FSK modulation, or OFDM modulation method.

The sub-frequency bands may be controlled by the controller. Specifically, an FIFO sending queue is maintained for each sub-frequency band at the controller; when a base station receives a user data packet to be sent to a user terminal from the core network, the base station reports a request packet to the controller; a wireless controller selects a sub-frequency band which currently has a shortest FIFO sending queue to service the user terminal, and inserts the request packet to the FIFO sending queue; the sub-frequency band at the head of the FIFO sending queue acquires the current sending opportunity, and thus one or a plurality of base stations transmit data for a plurality of user terminals sharing a sub-frequency band; and the terminal sequence code and a corresponding user data packet of a plurality of user terminals are sequentially modulated to the sub-frequency band for transmission, wherein the terminal sequence code of a user terminal is followed by the user data packet which is further followed by the terminal sequence code of a next user terminal and the user data packet of the next user and the like.

The user terminal receives data:

(1) An induplicate terminal sequence code is assigned to each user terminal.

(2) The user terminal performs polling on a sub-frequency band to detect whether a terminal sequence code carried in a signal is the same as the terminal sequence code assigned to the user terminal.

(3) If it is detected on the sub-frequency band that the terminal sequence code is the same as the terminal sequence code assigned to the user terminal, a user data packet following the terminal sequence code is received.

Herein the received user data packet may be demodulated by using a common demodulation method, for example, FDMA demodulation, OFDM demodulation and the like.

(4) If it is detected that the terminal sequence code is not the same as the terminal sequence code assigned to the user terminal, the data packet following the terminal sequence code is not received.

2. In uplink transmission of data:

The user terminal sends data:

(1) The core network assigns an induplicate base station sequence code each base station.

The base station sequence code may be sent by the base station to each user terminal connected to the base station when the user terminal requests an access to the base station.

(2) The system divides a frequency band into n sub-frequency bands/sub-carriers (n channels).

(3) The user terminal shares a sub-frequency band/sub-carrier to send data to a plurality of base stations to which the user terminal is connected, and sequentially modulates the base station sequence codes of a plurality of base stations and a corresponding user data packet to be sent to the base stations to the sub-frequency band for transmission, wherein the base station sequence code of a base station is followed by the user data packet to be sent to the base stations which is further followed by the base station sequence code of a next base station and a next user data packet to be sent to the next base station.

The terminal sequence code of a wireless base station may be modulated to the sub-frequency band by using a common modulation method, for example, FSK modulation, or OFDM modulation method.

The base station receives data:

(1) An induplicate base station sequence code is assigned to each base station.

(2) The base station performs polling on an uplink sub-frequency band to detect whether a base station sequence code carried in a signal is the same as the base station sequence code assigned to the base station.

(3) If it is detected on the sub-frequency band that the base station sequence code is the same as the base station sequence code assigned to the base station, a user data packet following the base station sequence code is received.

(4) If it is detected that the base station sequence code is not the same as the base station sequence code assigned to the base station, the data packet following the base station sequence code is not received.

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A sub-frequency band sharing method, comprising:
  assigning a unique terminal sequence code to a user terminal, and sending the terminal sequence code to the user terminal when the user terminal is connected to a base station;
  receiving a user data packet sent by a core network;
  parsing the user data packet to acquire a destination user terminal to which the user data packet is to be sent;
  acquiring a terminal sequence code corresponding to the destination user terminal;
  acquiring an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; and modulating the user data packet and the acquired terminal sequence code to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

2. The method according to claim 1, wherein, the step of acquiring an idle sub-frequency band of the base station comprises:

reporting a request packet to a controller, wherein the request packet is used to request an idle sub-frequency band; and receiving an extracted idle sub-frequency band returned by the controller after the controller extracts the idle sub-frequency band from a frequency band queue according to the reported request packet.

3. A sub-frequency band sharing method, comprising:

acquiring, by a user terminal, a terminal sequence code of the user terminal, wherein the terminal sequence code is unique, and one terminal sequence code corresponds to one user terminal;

performing polling on sub-frequency bands comprised in a frequency band to detect whether modulated data is present, wherein the frequency band is divided into a plurality of sub-frequency bands, and one or a plurality of base stations connected to the user terminal and a plurality of user terminals serviced by the one or a plurality of base stations share the sub-frequency band to transmit data;

extracting a terminal sequence code carried in the modulated data if the modulated data is present;

judging whether the extracted terminal sequence code is the same as the terminal sequence code of the user terminal;

extracting a user data packet from the modulated data if the extracted terminal sequence code is the same as the terminal sequence code of the user terminal; and discarding the modulated data if the extracted terminal sequence code is not the same as the terminal sequence code of the user terminal.

4. A sub-frequency band sharing method, comprising:

receiving a base station sequence code sent by a base station when a user terminal is connected to the base station, wherein the base station sequence code is unique, and one base station corresponds to one base station sequence code;

acquiring a base station sequence code of a destination base station, a to-be-sent user data packet and an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; and modulating the base station sequence code and the to-be-sent user data packet of the destination base station to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

5. A sub-frequency band sharing method, comprising:

acquiring, by a base station, a base station sequence code of the base station, wherein the base station sequence code is unique, and one base station corresponds to one base station sequence code;

performing polling on sub-frequency bands comprised in a frequency band to detect whether modulated data is present, wherein the frequency band is divided into a plurality of sub-frequency bands, and one or a plurality of base stations and a plurality of user terminals serviced by the one or a plurality of base stations share the sub-frequency band to transmit data;

extracting a base station sequence code carried in the modulated data if the modulated data is present;

judging whether the extracted base station sequence code is the same as the base station sequence code of the base station;

extracting a user data packet from the modulated data if the extracted base station sequence code is the same as the base station sequence code of the base station; and discarding the modulated data if the extracted base station sequence code is not the same as the base station sequence code of the base station.

6. A base station, comprising:

at least one processor; and a memory communicably connected with the at least one processor and storing one or more programs executable by the at least one processor, the one or more programs comprising:

an assigning module, configured to assign a unique terminal sequence code to a user terminal when the user terminal is connected to the base station;

a sending module, configured to send the terminal sequence code to the user terminal;

a receiving module, configured to receive a user data packet sent by a core network;

a parsing module, configured to parse the user data packet to acquire a destination user terminal to which the user data packet is to be sent;

a first acquiring module, configured to acquire a terminal sequence code corresponding to the destination user terminal;

a second acquiring module, configured to acquire an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; and a modulating module, configured to modulate the acquired terminal sequence code and the user data packet to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

7. The base station according to claim 6, wherein, the second acquiring module comprises:

a reporting unit, configured to report a request packet to a controller, wherein the request packet is used to request an idle sub-frequency band; and a receiving unit, configured to receive an extracted idle sub-frequency band returned by the controller after the controller extracts the idle sub-frequency band from a frequency band queue according to the reported request packet.

8. A user terminal, comprising:
at least one processor; and
a memory communicably connected with the at least one processor and storing one or more programs executable by the at least one processor, the one or more programs comprising:
an acquiring module, configured to acquire a terminal sequence code of the user terminal, wherein the terminal sequence code is unique, and one terminal sequence code corresponds to one user terminal;
a polling module, configured to perform polling sub-frequency bands comprised in a frequency band to detect whether modulated data is present, wherein the frequency band is divided into a plurality of sub-frequency bands, and one or a plurality of base stations connected to the user terminal and a plurality of user terminals serviced by the one or a plurality of base stations share the sub-frequency band to transmit data;
a first extracting module, configured to extract a terminal sequence code carried in the modulated data if the polling module detects that the modulated data is present;
a judging module, configured to judge whether the extracted terminal sequence code is the same as the terminal sequence code of the user terminal;
a second extracting module, configured to extract a user data packet from the modulated data if the judging module judges that the extracted terminal sequence code is the same as the terminal sequence code of the user terminal; and
a discarding module, configured to discard the modulated data if the judging module judges that the extracted terminal sequence code is not the same as the terminal sequence code of the user terminal.

9. A user terminal, comprising:
at least one processor; and
a memory communicably connected with the at least one processor and storing one or more programs executable by the at least one processor, the one or more programs comprising:
a receiving module, configured to receive a base station sequence code sent by a base station when a user terminal is connected to the base station, wherein the base station sequence code is unique, and one base station corresponds to one base station sequence code;
an acquiring module, configured to acquire a base station sequence code of a destination base station, a to-be-sent user data packet and an idle sub-frequency band in a frequency band, wherein the frequency band is divided into a plurality of sub-frequency bands, and one or a plurality of base stations connected to the user terminal and a plurality of user terminals serviced by the one or a plurality of base stations share the sub-frequency band to transmit data; and
a modulating module, configured to modulate the base station sequence code and the to-be-sent user data packet of the destination base station to the idle sub-frequency band according to a predetermined sequence to form modulated data, wherein the modulated data is transmitted over the idle sub-frequency band, and upon completion of the transmission of the modulated data, the sub-frequency band occupied by the modulated data is released.

10. A base station, comprising:
at least one processor; and
a memory communicably connected with the at least one processor and storing one or more programs executable by the at least one processor, the one or more programs comprising:
an acquiring module, configured to acquire a base station sequence code of the base station, wherein the base station sequence code is unique, and one base station corresponds to one base station sequence code;
a polling module, configured to perform polling on sub-frequency bands comprised in a frequency band to detect whether modulated data is present, wherein the frequency band is divided into a plurality of sub-frequency bands, and one or a plurality of base stations and a plurality of user terminals serviced by the one or a plurality of base stations share the sub-frequency band to transmit data;
a first extracting module, configured to extract a base station sequence code carried in the modulated data if the polling module detects that the modulated data is present;
a judging module, configured to judge whether the extracted base station sequence code is the same as the base station sequence code of the base station;
a second extracting module, configured to extract the base station sequence code carried in the modulated data if the judging module judges that the extracted base station sequence code is the same as the base station sequence code of the base station; and
a discarding module, configured to discard the modulated data if the judging module judges that the extracted base station sequence code is not the same as the base station sequence code of the base station.

11. The method according to claim 1, wherein the method further comprises:
establishing a mapping relationship between the user terminals and terminal sequence codes during assignment of the terminal sequence codes.

12. The method according to claim 1, wherein the step of assigning a unique terminal sequence code to a user terminal comprises:
extracting the MAC address of the user terminal, and using the MAC address as the terminal sequence code of the user terminal.

13. The method according to claim 3, wherein the step of acquiring, by a user terminal, a terminal sequence code of the user terminal comprises:
receiving the terminal sequence code sent by the base station, wherein the terminal sequence code is assigned by the base station; or
acquiring the terminal sequence code of the user terminal by negotiation between the base station and the user terminal.

14. The method according to claim 4, wherein the step of acquiring an idle sub-frequency band in a frequency band comprises:
applying for the idle sub-frequency band to a controller, wherein the idle sub-frequency band is uniformly managed by the controller.

15. The method according to claim 5, wherein the step of acquiring, by a base station, a base station sequence code of the base station comprises:
receiving a base station sequence code assigned by the core network.

16. The base station according to claim 6, wherein the base station further comprises:

an associating module, configured to establish a mapping relationship between the user terminals and terminal sequence codes during assignment of the terminal sequence codes.

17. The base station according to claim 6, wherein the assigning module is further configured to:
extract the MAC address of the user terminal, and use the MAC address as the terminal sequence code of the user terminal.

18. The user terminal according to claim 8, wherein the acquiring module is further configured to:
receive the terminal sequence code sent by the base station, wherein the terminal sequence code is assigned by the base station; or
acquire the terminal sequence code of the user terminal by negotiation between the base station and the user terminal.

19. The user terminal according to claim 9, wherein the acquiring module is further configured to:
apply for the idle sub-frequency band to a controller, wherein the idle sub-frequency band is uniformly managed by the controller.

20. The base station according to claim 10, wherein the acquiring module is further configured to receive a base station sequence code assigned by the core network.

* * * * *